INVENTOR.
CHARLES L. ELDREDGE
BY Kinney, Alexander,
Sell, Steldt & DeLaHunt
ATTORNEYS Oct. 5, 1971 C. L. ELDREDGE 3,609,941
ANIMAL MASK
Filed Jan. 26, 1970 2 Sheets-Sheet 2

INVENTOR.
CHARLES L. ELDREDGE
BY Kinney, Alexander,
Sell, Steldt & DeLaHunt
ATTORNEYS

3,609,941
ANIMAL MASK
Charles L. Eldredge, St. Paul, Minn., assignor to Minnesota Mining and Manufacturing Company, St. Paul, Minn.
Filed Jan. 26, 1970, Ser. No. 5,643
Int. Cl. B68b 5/00; B68c 5/00
U.S. Cl. 54—80                                                6 Claims

ABSTRACT OF THE DISCLOSURE

A mask for warming air breathed by a horse is formed from mask material supported on a frame peripherally contoured to fit snugly in the area adjacent the horse's nostrils and above the mouth. The preferred frame is formed of a coarse plastic mesh.

BACKGROUND OF THE INVENTION

The invention relates to respiratory masks, particularly of the type for warming inspired air.

For at least a century it has been known that for a horse to breathe cold air was not only uncomfortable but also physically damaging. At one time farmers in the northern part of the United States commonly wrapped a scarf around the nose of a horse used to pull a bobsled or engage in heavy labor during cold winter weather to ward off pneumonia or frostbitten respiratory passages. Unfortunately, however, a scarf quickly becomes saturated with moisture and often freezes over the horse's nostrils. This tendency is aggravated by a horse's normal tendency to salivate, or slobber, excessively.

Cold weather masks for use by human beings are known; see, for example, Barghini et al. U.S. Pat. 3,333,585 which discloses a cup-shaped masked formed of nonwoven resilient porous fibrous fabric designed to conform to the face of the wearer, extending over the nose and mouth. Previous attempts to use a mask of this type on horses, however, have been fraught with the identical problem encountered by farmers of an earlier era; saliva and condensed moisture vapor tend to freeze the mask in the area adjacent the nostrils. Thus, although limp bag-like respiratory masks for minimizing smoke inhalation were long ago disclosed in U.S. Pat. 327,762, devices designed to protect a horse's nostrils in cold weather have generally been of the type shown in U.S. Pat. No. 381,285 and 501,463, i.e., formed of rigid material which deflects, rather than filters, air which is to be breathed.

The horse no longer is a major factor in transportation or argiculture, of course, but winter harness racing is today increasing greatly in popularity. Although spectators typically sit in a heated enclosure, the horses perform out-of-doors and the unsolved cold air problem has remained acute. The rapid breathing of frigid air through widely distended nostrils during racing can seriously affect the health of the extremely valuable animals.

SUMMARY

The present invention provides a simple mask for attachment to a horse to prevent the lungs of the animal from becoming frostbitten. The device is simple, lightweight, readily attached without discomfort to the animal, and yet insures that virtually all the air inhaled or exhaled passes therethrough. The heat exchange which takes place within the mask maintains a sufficiently high temperature to prevent freezing. The mask does not come in contact with the nostrils and hence insures that air will be drawn through the entire mask fabric. This novel device also takes advantage of the fact that, unlike many other animals, a horse is almost completely anatomically unable to breathe through its mouth; hence the mask does not surround the entire muzzle, thereby eliminating the problems caused by excessive salivation.

Basically the mask involves a cage-like collapse-resistant lightweight frame which conforms peripherally to the area of a horse's head adjacent the nostrils and supports a mask fabric material. The present invention is generic to the species shown in assignee's copending application, Barghini et al. S.N. 706,229, which discloses a mask having a complex frame arrangement comprising several specially constructed members and a specially molded mask fabric, whereas the preferred embodiment of the instant invention may utilize commercially available plastic mesh to form a unitary frame of uncomplicated construction, and commercially available foam sheet to provide the mask fabric.

BRIEF DESCRIPTION OF THE DRAWING

Understanding of the invention will be facilitated by referring to the accompanying drawings, in which like numbers refer to like parts in several views and in which.

DESCRIPTION OF THE PRESENTLY PREFERRED EMBODIMENT

The mask assembly comprises a cage-like frame to which mask fabric is attached. The cage-like frame includes a support means having a rounded front peripheral portion, substantially straight side portions and an arched rear peripheral portion. The support means approximates the conformation of that nostril-including portion of a horse's head lying on the continuous imaginary line defined roughly by the upper lip and a line extending across the face connecting the corners of the mouth. The front and side peripheral portions of the support means are resilient.

Figure 4:
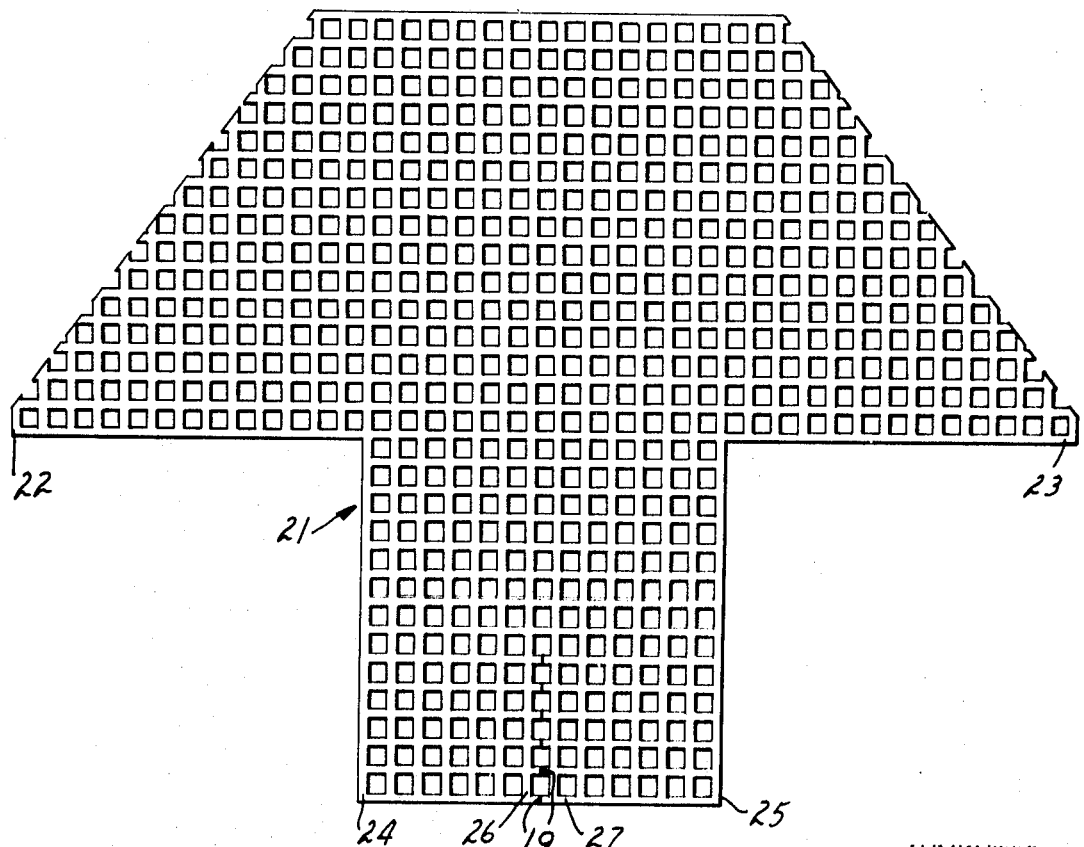
FIG. 4 is a plan view of a blank for forming the frame of the mask assembly.

As shown in the drawing, (the preferred support means 20 is contoured from a flat sheet of relatively stiff but resilient plastic netting or mesh, cut in the T-shape of mesh blank 21 shown in FIG. 4. Mesh blank 21, as shown in the figure, is characterized by left tip 22, right tip 23, left outside corner 24, right outside corner 25, left inside corner 26, right inside corner 27, and cut 19. Cut 19 extends upwardly, as shown in FIG. 4, a distance approximately equal to about one-fifth the length of the edge defined by corners 24 and 25.

The support means 20 formed from blank 21 by first overlapping and connecting left and right inside corners 26 and 27 to provide the rounded front peripheral portion, and then overlapping and connecting left tip 22 with left outside corner 24, and right tip 23 with right outside corner 25, to provide the substantially straight side portions and the arched rear peripheral portion. The preferred method of connecting the overlapping corners is by heat sealing the plastic mesh.

With the support means contoured in the desired shape, the frame is provided with a resilient longitudinal means attached at its first end near the center of the rounded front portion of the support means and at its second end near the arched rear peripheral portion. The resilient longitudinal means, extending over an area midway between the two sides of the frame and connecting the front and rear portions of the support means, provides a means for supporting the frame upon the nose and bony portion of a horse's face.

Figure 2:
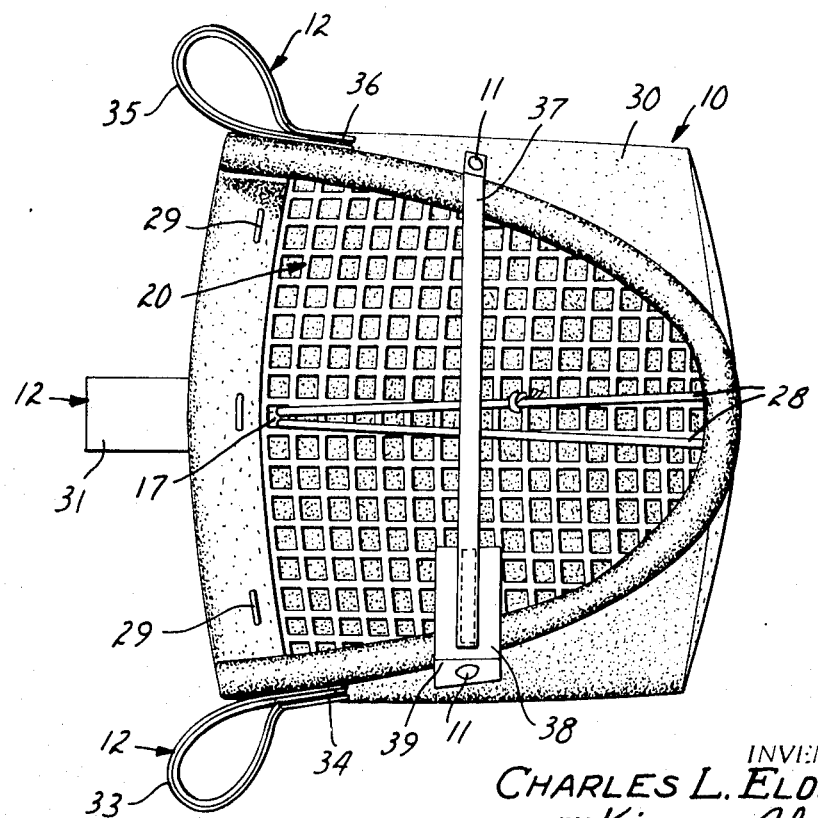
FIG. 2 is a bottom view of the mask assembly.
Figure 3:
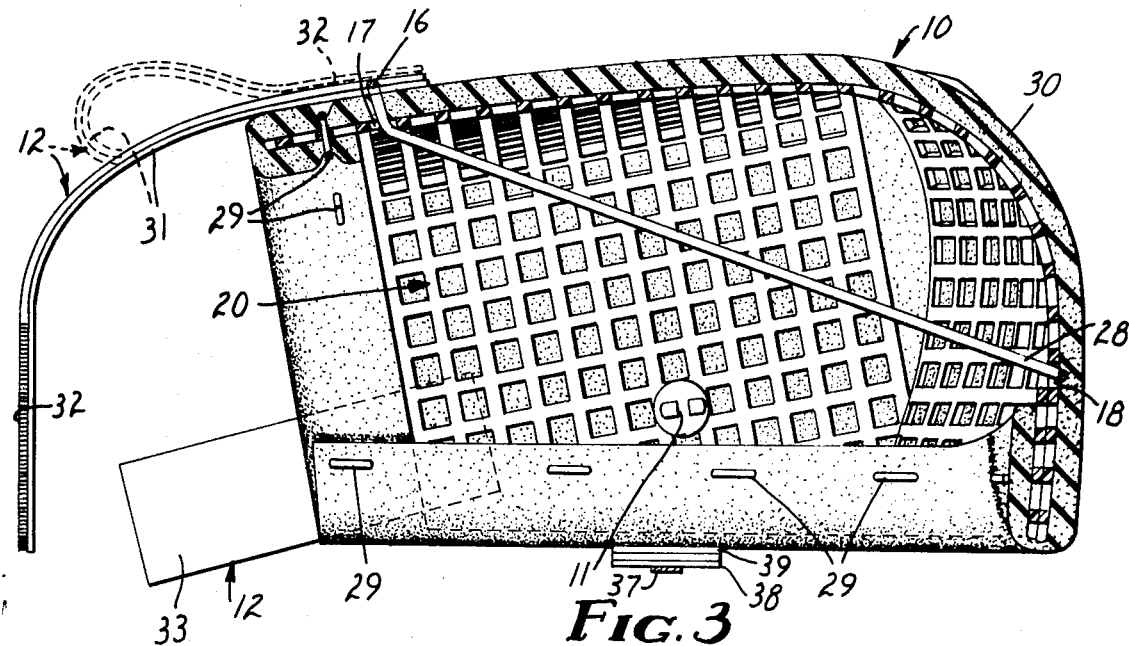
FIG. 3 is a longitudinal cross-section of the mask assembly.

In the preferred embodiment, shown in FIGS. 2 and 3, the resilient longitudinal means is a cord 28 looped through openings in the mesh at location 18, extending to the arched rear of the frame passing through mesh opening 17, and fastened to strap 31 at location 16. This looping method provides a simple means of attaching the cord 20 using only one knot and results in a longitudinal means having two strands. A single strand, equally useful, may be provided by attaching the cord at both ends.

The cord 28 should not irritate the skin of a horse's nose, and should resist moisture-induced rotting. A nylon cord is used in the preferred embodiment although other materials may serve equally well (e.g., synthetic fibrous materials such as polypropylene cord, or strips of resilient pliable material such as leather, cloth, plastic, and the like).

The frame 20 has a resilient cross means connecting the two side peripheral portions of the support means arched thereabove to substantially avoid contact with the nose and nostrils of a horse's head when the mask is mounted. In the preferred embodiment the cross means comprises the arched roof and the walls of the contoured mesh support means 20. This portion of the mesh support means extends well above the longitudinal means (the cord 28) and bows that portion of the mask out beyond the sides of the nose and upper lip conforming peripheral portion of the frame. It also provides support for mask fabric 30, insuring that the fabric remains out of contact with the horse's nostrils, even when they are distended to several times their normal size, which commonly occurs when the horse is exerting himself.

The cage-like frame with the above-described elements may be provided through other means. For example, as disclosed in the aforementioned Barghini et al. application, the frame is assembled from several individual resilient members to obtain the elements above. Similarly, a frame having the required elements may be injection molded, using well known techniques, to form a unitary, formed cage-like frame directly.

The preferred support means is desirably formed from a sheet of relatively stiff but resilient supple, shock-resistant plastic lattice, net, or mesh having bonded crossing strands (e.g., nylon, polyethylene, polyvinyl chloride, polypropylene, etc.). Unoriented isotactic polypropylene having 4 openings per square inch and an average strand thickness of 3/16 inch provides a suitable mesh. Considerable variation from these dimensions may be had without impairing the usefulness of the supporting means.

Adjustable fasteners 12, capable of repeated attachment and detachment, hold the mask firmly in position on head preventing the horse from dislodging the mask. As shown in FIG. 2 the preferred fastener 12 has a strap covered with looped pile and, at the free end of the strap, an attachment portion comprising a plurality of barbed projections. Thus, to appropriate rear positions of the frame, are connected pile-covered straps 33 and 35, having barbed attachment portions 34 and 36 at their free ends which are passed around a portion of the bridle, halter, or similar conventional head harness and connected to the pile-covered straps.

To insure the desired tension upon cord 28 in the preferred embodiment, a fastener 12 is attached one end thereof at location 16. Pile-covered strap 31 of the fastener 12 having barbed fastener portion 32 at its free end, is passed around the head harness of a horse and adjusted to the proper tension. This fastener also provides additional means to hold the mask 10 in position on a horse's head. This fastener is not normally required for masks having longitudinal means attached at both ends to the support means.

A strap or band is attached to either side of the straight peripheral portion of the frame to provide an attachment means around the horse's lower jaw which will allow the animal to open his mouth but prevent him from dislodging the mask 10. An elastic strap 37, attached on one side of the straight peripheral portion of the frame having a fastener at its free end capable of being attached to the other side, provides the jaw attachment means in the preferred embodiment. The fastener comprises barbed portion 38 on the end of strap 37 and looped pile-covered segment 39 attached to the other side of the frame. The preferred method of attaching the elastic strap 37 and the strap segment 39 to the frame is by rivets 11.

Mask fabric 30 may be selected from a number of materials, including nonwoven porous fibrous fabric such as that disclosed in the aforementioned Barghini et al. Pat. 3,333,585, the disclosure of which is incorporated herein by reference, and reticulated synthetic sponge sheets. The preferred fabric is reticulated polyurethane foam about 1/4 inch thick and having from about 20 to 100 pores per inch, most preferably from about 20 to 80 pores per inch. Such fabrics have been found effective in maintaining the air inside the mask at approximately 50° F. or higher, essentially independent of the temperature of the outside air, in winter conditions.

Figure 1:
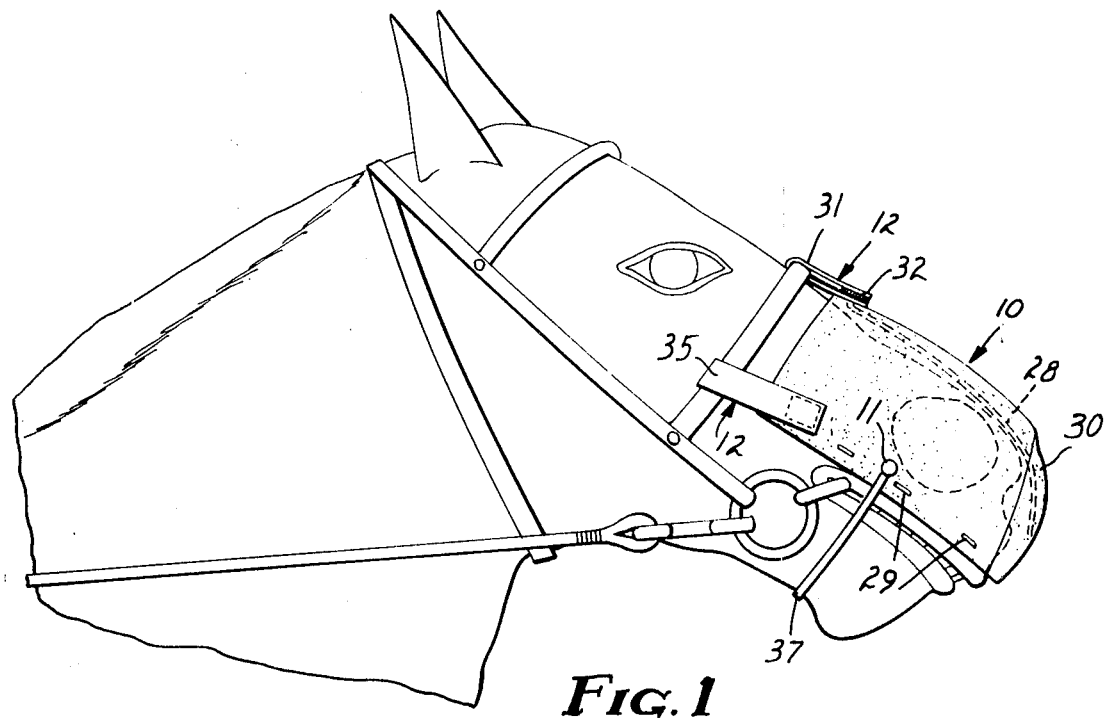
FIG. 1 is a side view showing the mask assembly of the invention mounted on a horse's head.

Extending throughout the peripheral interior of the frame, and attached thereto is a band of synthetic sponge material formed of a light-weight polyurethane foam about 1/4 inch thick. Preferably the band is provided by cutting the mask fabric in a shape slightly larger than the assembly frame, shaping the fabric over the mask, folding the excess fabric around the lower edge of the frame and into the peripheral interior of the mask, and fastening the fabric therein. The band extends around the raw edge of the mask frame, presenting a finished appearance and, further, reducing any possibility of irritating the skin of the horse. When mask 10 is mounted on the head of the horse, as is particularly shown in FIG. 1, the lower edge of the sponge extends slightly above the lower edge of the horse's upper lip, permitting clearance of the bit. When the various holding means are appropriately connected, mask 10 is held firmly on the horse's head and peripherally sealed so that substantially all of the air breathed in or out passes through mask fabric 30.

To make certain that the sensitive forward portion of the horse's lip is not chafed, and further to prevent the horse from chewing on the edge of the mask, the forward portion of the sponge band extends somewhat higher than the other portions.

It will be recognized that numerous modifications and extensions of this invention will occur to those skilled in the art. For example, although the outstanding utility of masks in accordance with this invention is for warming the air breathed by a horse, it is entirely possible to place within the mask, medications which the horse is to breathe. It will also be appreciated that, where the primary purpose of the mask is to prevent the passage of dust, somewhat different fabrics than that discussed hereinabove may be employed successfully. Likewise, masks may be dyed or pigmented in colors which contrast sharply with that of the horse, thereby facilitating the photographic determination of a winner in a close race.

What is claimed is:

1. A cold weather mask assembly for equine animals, comprising in combination:
    a cage-like collapse-resistant frame having:
        a support means which is contoured to have a rounded front peripheral portion, substantially straight side peripheral portions and an arched rear peripheral portion, thereby approximating the conformation of that nostril-including portion of a horse's head lying on the continuous imaginary line defined roughly by the upper lip and a line extending across the face connecting the corners of the mouth, at least the front and side peripheral portions of said support means being resilient,
        a resilient longitudinal means extending over an area approximately midway between the two sides of said frame, connecting rear and front portions of said support means, thereby providing a means for supporting said frame upon the nose and bony portion of a horse's face, a resilient cross means connecting the two side peripheral portions of said support means and sufficiently arched thereabove to substantially avoid contact with the nose and nostrils of a horse's head when said mask is mounted thereon, a porous cold weather mask fabric contoured to fit over said frame and attached thereto, said frame preventing said fabric from contacting the nostrils of a horse on which the mask is mounted, and means on said frame for holding said mask on a horse's head, comprising means for connecting the rear portion of said frame to conventional head harness, means for connecting the two sides of said frame under the lower jaw of a horse, and compressible sealing means along the peripheral interior of said mask, whereby the peripheral portion of the mask can be brought snugly into contact with the head of the horse and held firmly in place so that the horse is prevented from dislodging the mask and substantially all the air inhaled and exhaled by the horse passes through the mask fabric.

2. The mask of claim 1 wherein the frame is formed from a single piece of relatively stiff but resilient plastic mesh.

3. The mask of claim 1 wherein the frame is formed from a single piece of unoriented isotactic polypropylene mesh.

4. The mask of claim 1 wherein the porous cold weather fabric is soft polyurethane foam.

5. The mask of claim 4 wherein the polyurethane foam porous cold weather fabric extends beyond the peripheral edge of said frame and is folded into the peripheral interior of said mask to provide an integral compressible sealing means.

6. The mask of claim 1 wherein the resilient longitudinal means comprises a cord.

References Cited

UNITED STATES PATENTS

| 960,142 | 5/1910 | Anctil | 54—80 |
|---------|--------|--------|-------|
| 1,311,933 | 8/1919 | Weigel | 54—80 |
| 3,464,410 | 9/1969 | Buchanan | 128—140 |
| 3,491,755 | 1/1970 | Barghini | 128—212 |

ALDRICH F. MEDBERY, Primary Examiner

U.S. Cl. X.R.

128—212

Disclaimer and Dedication 3,609,941.—*Charles L. Eldredge*, St. Paul, Minn. ANIMAL MASK. Patent dated Oct. 5, 1971. Disclaimer and dedication filed Jan. 16, 1981, by the assignee, *Minnesota Mining and Manufacturing Co.*

Hereby disclaims and dedicates to the Public the remainder of the term of said patent.

[*Official Gazette April 28, 1981.*]